(12) United States Patent
Fujimoto et al.

(10) Patent No.: US 9,992,632 B2
(45) Date of Patent: Jun. 5, 2018

(54) MOBILE APPARATUS AND SERVICE PROVIDING SYSTEM

(71) Applicant: FUJI XEROX CO., LTD., Tokyo (JP)

(72) Inventors: Hideki Fujimoto, Yokohama (JP); Tetsuya Kobayashi, Yokohama (JP); Mariko Miyazaki, Yokohama (JP); Kunitoshi Yamamoto, Yokohama (JP); Hajime Kajiyama, Yokohama (JP); Naoya Ogata, Yokohama (JP); Akira Ichikawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/374,517

(22) Filed: Dec. 9, 2016

(65) Prior Publication Data

US 2017/0318436 A1  Nov. 2, 2017

(30) Foreign Application Priority Data

Apr. 27, 2016 (JP) ................................ 2016-088685

(51) Int. Cl.
| | |
|---|---|
| *H04W 16/20* | (2009.01) |
| *H04W 4/04* | (2009.01) |
| *H04W 4/02* | (2018.01) |
| *G06F 3/12* | (2006.01) |
| *G05D 1/02* | (2006.01) |

(52) U.S. Cl.
CPC .......... *H04W 4/043* (2013.01); *G05D 1/0217* (2013.01); *G05D 1/0246* (2013.01); *G06F 3/126* (2013.01); *G06F 3/1212* (2013.01); *G06F 3/1285* (2013.01); *H04W 4/023* (2013.01); *H04W 16/20* (2013.01); *G05D 2201/0211* (2013.01)

(58) Field of Classification Search
CPC ..... G06F 3/1288; G06F 3/1291; G06F 3/1285
USPC ........... 455/456.1–456.3; 400/582, 605, 624; 358/1.15
See application file for complete search history.

(56) References Cited

U.S. PATENT DOCUMENTS

2014/0309835 A1  10/2014  Yamamoto
2015/0378652 A1  12/2015  Sakurai

FOREIGN PATENT DOCUMENTS

JP  2001-125646 A  5/2001
JP  2003-110779 A  4/2003

OTHER PUBLICATIONS

Jul. 21, 2017 Search Report issued in European Patent Application No. 16207088.2.

*Primary Examiner* — Sam Bhattacharya
(74) *Attorney, Agent, or Firm* — Oliff PLC

(57) ABSTRACT

A mobile apparatus travels within a predetermined service provision area and, in response to receiving an instruction to provide a service from at least one user present in the service provision area, travels to the user to provide the service to the user. The mobile apparatus moves to a priority stand-by position which is determined based on a location of the at least one user from a plurality of stand-by positions provided within the service provision area and waits for the instruction to provide a service.

10 Claims, 19 Drawing Sheets

FIG. 7

| SEAT NUMBER | STAND-BY POSITION 1 | STAND-BY POSITION 2 | STAND-BY POSITION 3 | MULTIFUNCTION MACHINE |
|---|---|---|---|---|
| 001 | a1 | b1 | c1 | d1 |
| 002 | a2 | b2 | c2 | d2 |
| 003 | a3 | b3 | c3 | d3 |
| 004 | a4 | b4 | c4 | d4 |
| ⋮ | ⋮ | ⋮ | ⋮ | ⋮ |

FIG. 8

| ID OF USER PRESENT IN OFFICE | SEAT NUMBER | WEIGHTING OF EACH USER |
|---|---|---|
| 0 1 0 | 0 0 9 | 1 |
| 0 1 3 | 0 2 1 | 1 0 |
| 0 2 2 | 0 3 3 | 1 |
| 0 3 5 | 0 0 2 | 2 |
| ⋮ | ⋮ | ⋮ |

FIG. 16A

| ORDER OF INSTRUCTION | USER NAME | DISTANCE |
|---|---|---|
| 1 | USER A | — |
| 2 | USER B | 9.0m |
| 3 | USER C | 5.0m |

FIG. 16B

| PRIORITY | USER NAME | DISTANCE |
|---|---|---|
| (FINISHED) | USER A | — |
| 1 | USER C | 4.0m |
| 2 | USER B | 5.0m | ved
MOBILE APPARATUS AND SERVICE PROVIDING SYSTEM

CROSS-REFERENCE TO RELATED APPLICATIONS

This application is based on and claims priority under USC 119 from Japanese Patent Application No. 2016-088685, filed on Apr. 27, 2016.

BACKGROUND

Technical Field

The present invention relates to a mobile apparatus and a service providing system.

Related Art

A system that provides a service while autonomously traveling within a predetermined space in an office has been proposed.

SUMMARY

According to an aspect of the invention, there is provided a mobile apparatus that travels within a predetermined service provision area and, in response to receiving an instruction to provide a service from at least one user present in the service provision area, travels to the user to provide the service to the user, the mobile apparatus moving to a priority stand-by position which is determined based on a location of the at least one user from a plurality of stand-by positions provided within the service provision area and waiting for the instruction to provide a service.

BRIEF DESCRIPTION OF THE DRAWINGS

Exemplary embodiment(s) of the present invention will be described in detail based on the following figures, wherein:

FIG. 3 is a flowchart illustrating a flow of processing in a client apparatus in a case where a user logs in;

FIG. 7 is a table illustrating numbers given to respective seats in the office and movement distances between the seats and stand-by positions;

FIG. 8 is a table illustrating a correspondence relationship among IDs of users present in the office, seat numbers of the users, and respective "weightings" of the users;

FIGS. 16A and 16B are diagrams for explaining a selection algorithm of a job to be executed next.

DETAILED DESCRIPTION

Figure 1:
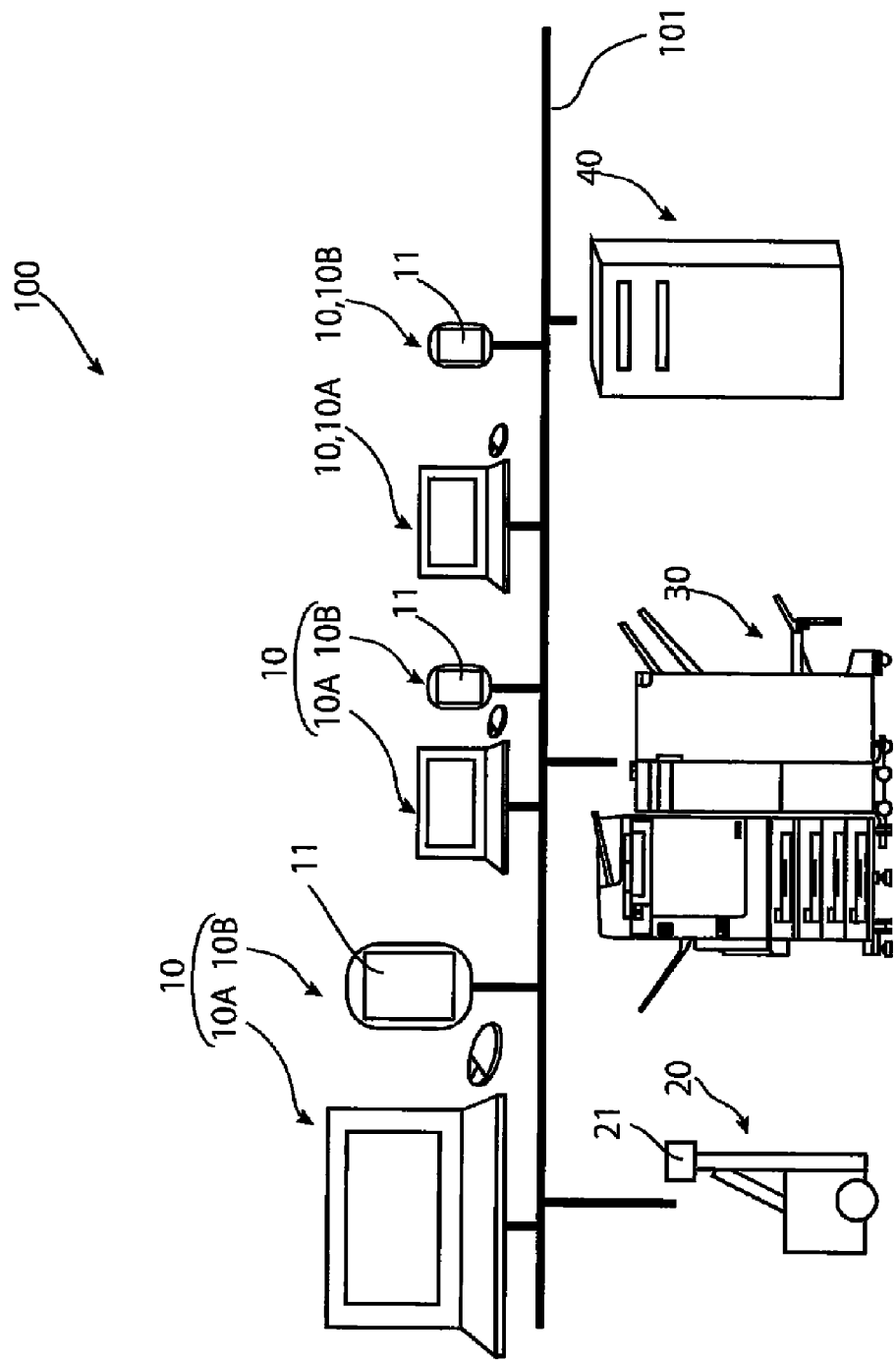
FIG. 1 is a diagram illustrating an overall configuration of a printing system as an exemplary embodiment of the present invention.

Hereinafter, an exemplary embodiment of the present invention will be described.
(System Configuration)
FIG. 1 is a diagram illustrating an overall configuration of a printing system as an exemplary embodiment of the present invention.

A printing system 100 includes a self-traveling printer 20. In the printing system 100, the self-traveling printer 20 moves to a user who issues an instruction to perform printing out according to the instruction from the user and performs the printing out after authenticating the user.

The printing system 100 includes plural notebook type personal computers (hereinafter, abbreviated to "notebook PC") 10A and plural portable type terminal apparatus (hereinafter, abbreviated to "portable terminal") 10B. Each of the notebook PC 10A and the portable terminal 10B may constitute a client apparatus 10 alone, and a pair of the notebook PC 10A and the portable terminal 10B which are synchronized by the same user may constitute the client apparatus 10. Each client apparatus 10 transmits an instruction to perform printing out. The portable terminal 10B is provided with a touch panel type display screen 11 and it is possible to input an instruction to the portable terminal 10B by touching the display screen 11 with a finger.

In addition, the printing system 100 includes the self-traveling printer 20. The self-traveling printer 20 corresponds to an example of a mobile apparatus in the present invention. The self-traveling printer 20 includes an IC card reader (not shown). The self-traveling printer 20 moves to the vicinity of a seat of a user who issues an instruction to perform printing out, and performs the printing out after authenticating the user using an IC card.

The self-traveling printer 20 includes a camera 21. The self-traveling printer 20 is configured to observe a path along a traveling direction thereof with the camera 21 facing the traveling direction at all times and determine whether the self-traveling printer 20 can travel along the path thereby autonomously traveling while avoiding obstacles.

The self-traveling printer 20 accommodates only A4 size paper sheets and thus cannot perform the printing out on paper sheets of sizes other than A4. In addition, the self-traveling printer 20 does not have a so-called post processing function such as a function of punching printed out paper sheets and stapling printed out paper sheets.

In addition, the printing system 100 includes a stationary multifunction machine 30. The multifunction machine 30 is a composite device that has plural functions such as a function as a scanner and a function as a copying machine in addition to a function as a printer. The printing speed of the multifunction machine 30 is high and the number of accommodatable paper sheets in the multifunction machine 30 is large. Therefore, the multifunction machine 30 is suitable for massive printing compared to the self-traveling printer 20. The multifunction machine 30 accommodates paper sheets of various sizes in addition to A4 size paper sheets and the multifunction machine 30 is provided with a post processing device. Therefore, the multifunction machine 30 can meet various demands of the user. The multifunction machine 30 is also provided with an IC card reader (not shown), and a user who wants to perform the printing out using the multifunction machine 30 needs to put the user's own IC card on the IC card reader such that the multifunction machine 30 performs user authentication.

Furthermore, the printing system 100 includes a server apparatus 40. The server apparatus 40 receives an instruction to perform printing out which is transmitted from each client apparatus 10, assigns the printing instruction to one of the self-traveling printer 20 and the multifunction machine 30, and transmits a file to be printed out to the one of the self-traveling printer 20 and the multifunction machine 30 to which the printing instruction is assigned. Furthermore, in a case where the printing instruction is assigned to the self-traveling printer 20, the server apparatus 40 specifies a position where the traveling printer 20 needs to move, and issues an instruction to perform printing out at the position. The server apparatus 40 grasps the current location of the self-traveling printer 20 at all times using a communication unit or a detection unit (which are not shown).

The client apparatus 10, the self-traveling printer 20, the multifunction machine 30, and the server apparatus 40 in FIG. 1 are connected to each other via a wireless local area network (LAN) 101 and are capable of communicating with each other.

In addition, each of the client apparatus 10, the self-traveling printer 20, the multifunction machine 30, and the server apparatus 40 has a function of an arithmetic processing device to execute a program, and executes processing or an operation according to a program executed by the function.

The printing system 100 in FIG. 1 is disposed in an office with a following exemplary layout.

(Layout in Office)

Figure 2:
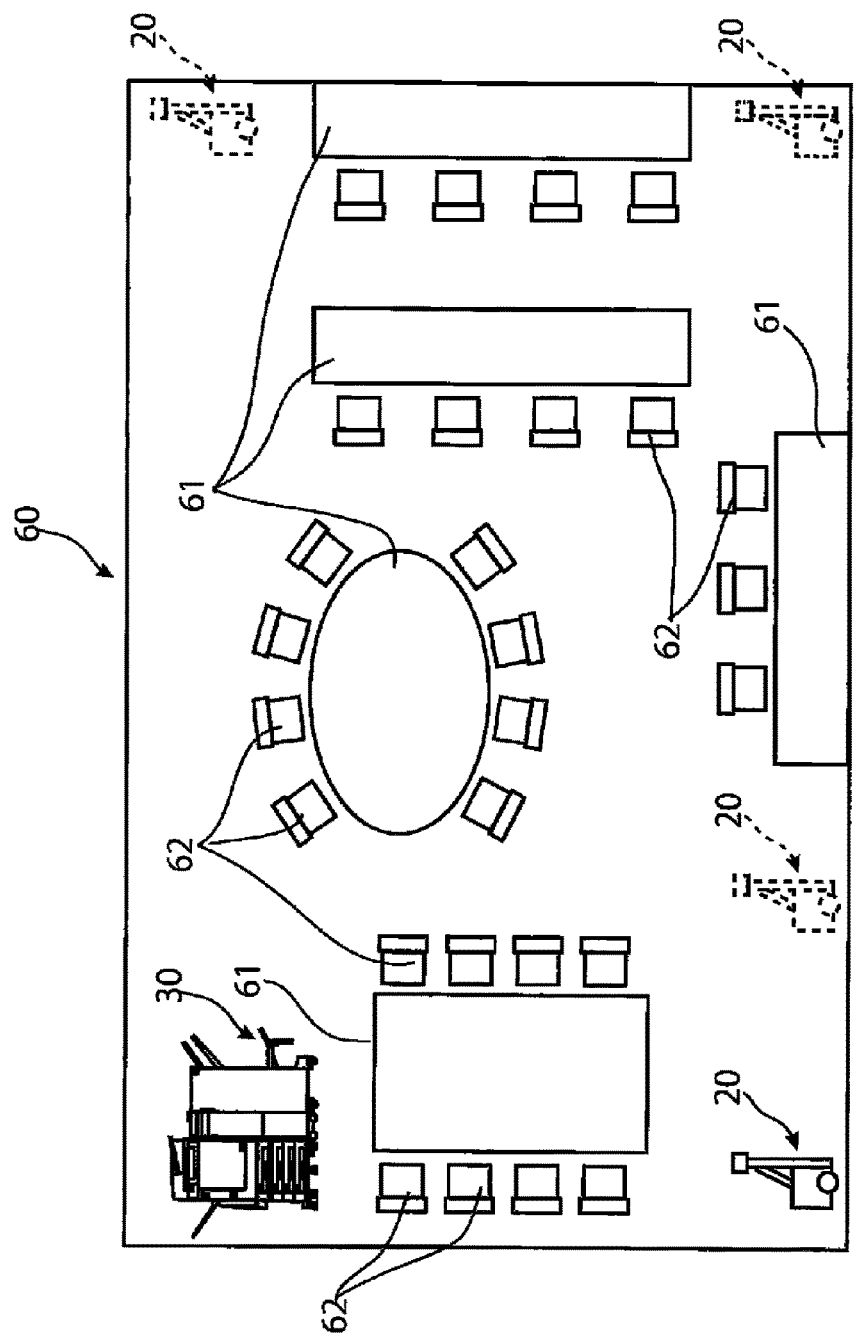
FIG. 2 is a schematic diagram illustrating a layout in an office.

FIG. 2 is a schematic diagram illustrating a layout in an office.

In an office 60, plural tables 61 and plural chairs 62 are arranged. For each chair 62, a unique seat number is given.

In the office 60, the self-traveling printer 20 and multifunction machine 30 in FIG. 1 are disposed. Although not shown in FIG. 2, the server apparatus 40 in FIG. 1 is disposed on a corner of the office 60. A place where the self-traveling printer 20 is illustrated with solid lines in FIG. 2 is a home position of the self-traveling printer 20. The self-traveling printer 20 is configured to move and perform printing out using electric power charged in a built-in battery (not shown) of the self-traveling printer 20. Therefore, the self-traveling printer 20 needs charging equipment and the charging equipment (not shown) is provided in the home position. When the self-traveling printer 20 moves to the home position, the self-traveling printer 20 is connected to the charging equipment and the built-in battery is charged.

In addition, three positions each of which the self-traveling printer 20 is illustrated in with dotted lines in FIG. 2 are stand-by positions without the charging equipment. These stand-by positions are determined in advance such that the movement of the user is not inhibited.

The server apparatus 40 in FIG. 1 stores map data including the entire layout in the office 60 such as the arrangement of the tables 61 and the chairs 62, the widths of paths, and the position of the multifunction machine 30 in the office 60. The map data or an instruction based on the map data is transmitted from the server apparatus 40 to the self-traveling printer 20 as necessary. The office 60 corresponds to an example of a service provision area in the present invention.

In the exemplary embodiment, the office 60 adopts a system in which even a user who has a right to use the office 60 is not assigned with a fixed seat (the chair 62) and each user sits on an available seat (the chair 62) when entering the office to carry out a task. Furthermore, in the exemplary embodiment, each user goes through an entry process when entering the office 60 at the entrance (not shown) of the office 60 and then given a one-day user ID. Each user enters the office after receiving an IC card with the user ID recorded thereon. The user ID which is given to each user when the user enters the office is transmitted to the server apparatus 40 (refer to FIG. 1 and is not shown in FIG. 2) and is registered in association with the user in addition to being recorded on the IC card. In addition, the IC card with the user ID recorded thereon is carried by the user and is returned when the user exits the office.

The printing system 100 built in the office 60 is a system in which, when a user who starts a task operates the user's own client apparatus 10 (the notebook PC 10A or the portable terminal 10B) and issues an instruction to perform the printing out, unless the printing out is performed by the multifunction machine 30, the self-traveling printer 20 moves to the seat of the user and performs the printing out after authenticating that the user is a user who has issued the instruction to perform the printing out. In a case where the printing out is performed by the multifunction machine 30, after the instruction to perform the printing out is issued, the user needs to move to an installation place of the multifunction machine 30.

(Login)

Figure 3:
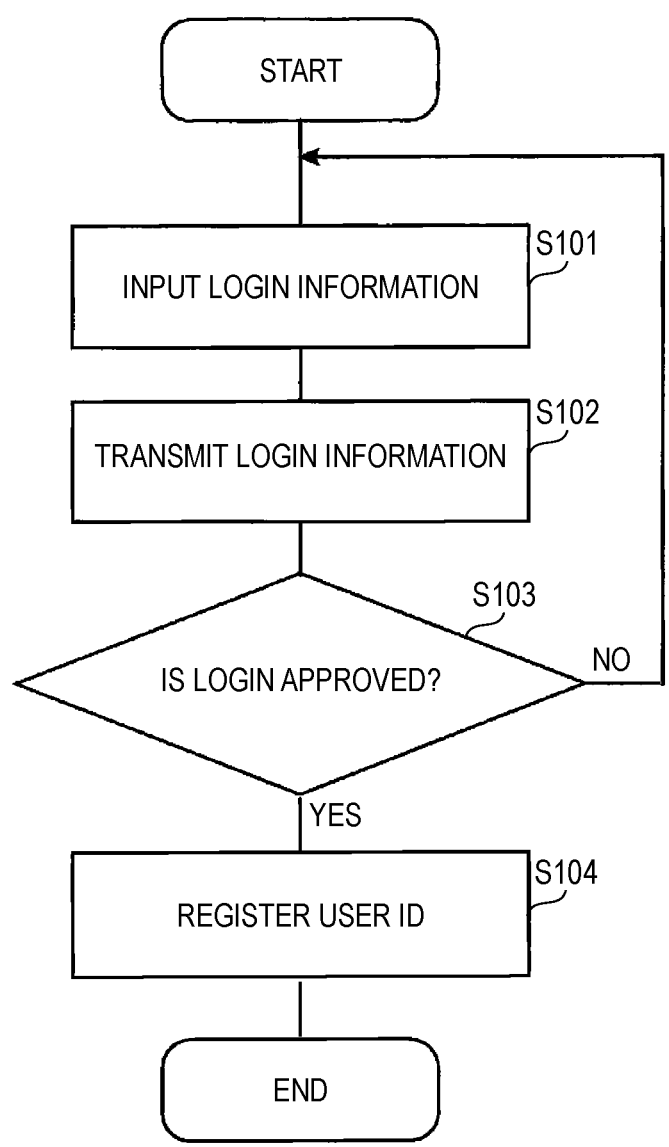

FIG. 3 is a flowchart illustrating a flow of processing in a client apparatus in a case where a user logs in.

Figure 4:
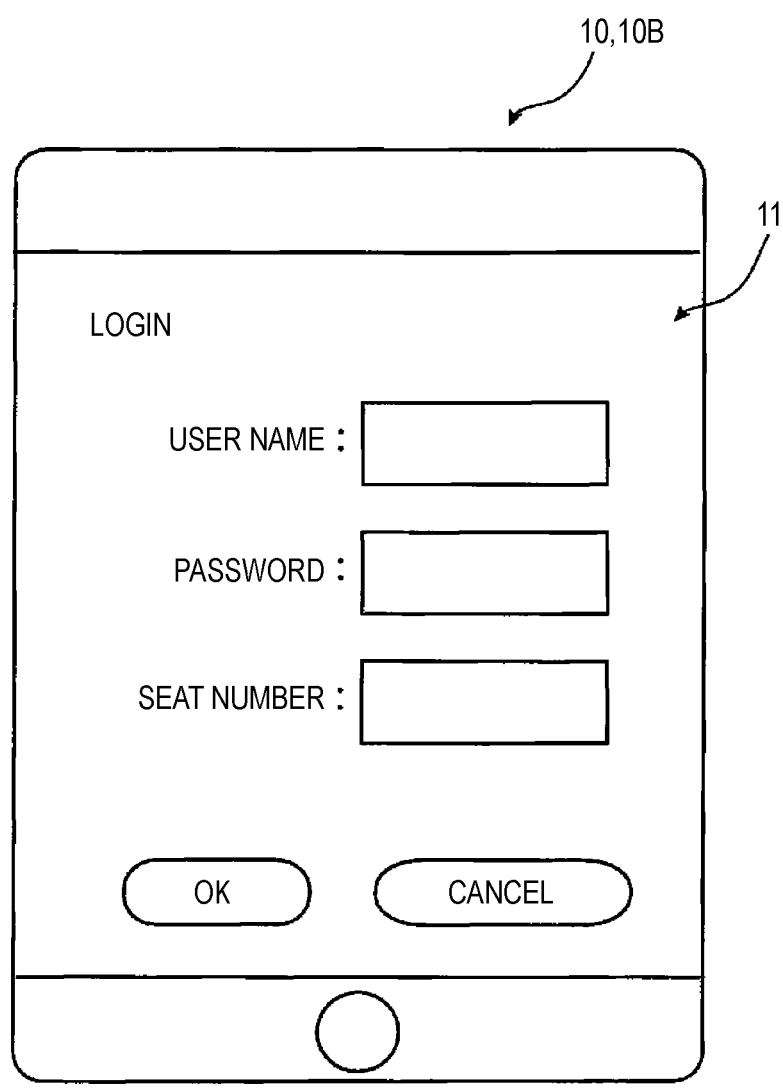
FIG. 4 is a diagram illustrating a login screen.

In addition, FIG. 4 is a diagram illustrating a login screen.

In the exemplary embodiment, the description will be made on the assumption that the portable terminal 10B is used as the client apparatus 10. It is obvious that the notebook PC 10A may be used as the client apparatus 10 or one user may selectively use one of the notebook PC 10A and the portable terminal 10B in accordance with the situation. Here, a difference between their usages is not particularly concerned.

After going through the entry process, the user enters the office 60 in FIG. 2, and sits on any of available seats (the chair 62) in the office 60. Then, the user operates the user's own client apparatus 10 and performs a login operation to start to use the printing system 100 installed in the office 60.

When performing the login operation, first, the user starts an application program (hereinafter, abbreviated to "application") for using the printing system 100. Then, on the display screen 11 of the client apparatus 10 (as described above, it is assumed that the portable terminal 10B is used as the client apparatus 10 here), a login screen as illustrated in FIG. 4 is displayed.

Here, a user name, a password, and a seat number are input on the login screen according to a user operation (Step S101 in FIG. 3). When these information items are input on the login screen in FIG. 4 and an "OK" button is touched, these information items are transmitted to the server apparatus 40 (refer to FIG. 1) (Step S102). When a notification indicating that the current login is approved from the server apparatus 40 is received (Step S103), a user ID transmitted along with the login approval is registered in the client apparatus 10 (Step S104) and the current login process is terminated. On the other hand, when a notification indicating that the login is not approved is received from the server apparatus 40 (Step S103), a re-inputting process with respect to the login screen in FIG. 4 is executed (Step S101).

Figure 5:
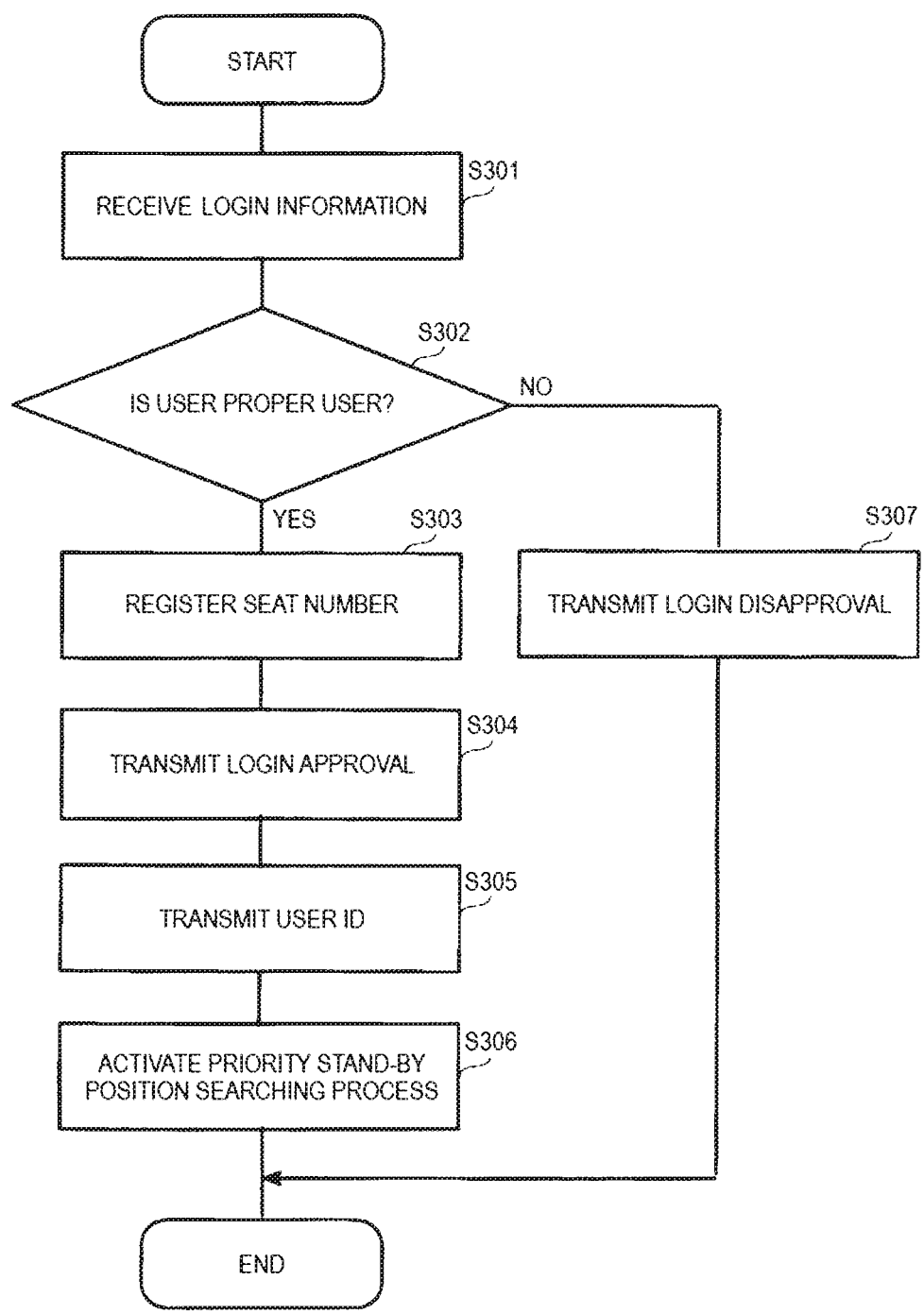
FIG. 5 is a flowchart illustrating a flow of processing in a server apparatus in a case where login information is transmitted from the client apparatus.

FIG. 5 is a flowchart illustrating a flow of processing in a server apparatus in a case where login information is transmitted from the client apparatus.

First, login information transmitted from the client apparatus 10 is received (Step S301).

The server apparatus 40 includes a user database in which user names of all of the users who have a right to use the office 60 and passwords are recorded being associated with each other. Furthermore, in the user database, the user IDs which are assigned to users when the users enter the office are also recorded being associated with the above items.

When the server apparatus 40 receives the login information (Step S301), a user name and a password in the login information is matched with a user name and a password in the user database to determine whether the user is a proper user who has a right to use the office 60 (Step S302). When the user is a proper user, a seat number in the login information is registered in the user database being associated with the user (Step S303), a login approval is transmitted to the client apparatus 10 (Step S304) and an ID number of the user recorded in the user database is transmitted to the client apparatus 10 (Step S305). Thereafter, a priority stand-by position searching process (FIG. 6) is activated.

On the other hand, when it is determined that the user cannot be recognized as a proper user on the basis of the current login information (Step S302), a login disapproval is transmitted to the client apparatus 10 from which the login information is transmitted (Step S307).

Processing in the client apparatus 10 which has received the login approval or the login disapproval is as described above (refer to FIG. 3).

(Selection of Priority Stand-by Position)

Figure 6:
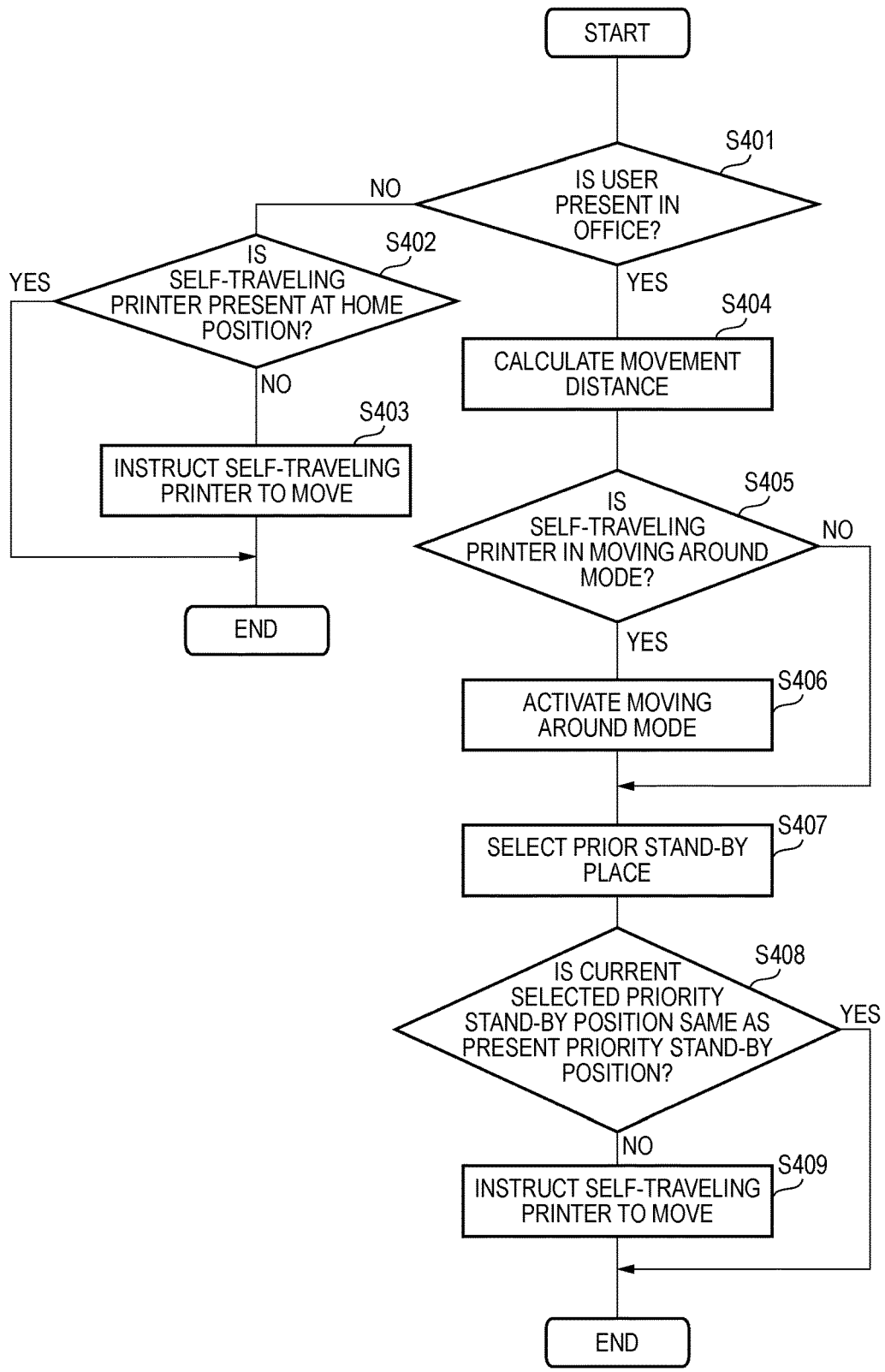
FIG. 6 is a flowchart illustrating a flow of processing executed by the server apparatus accompanying an increase or decrease in the number of users.

FIG. 6 is a flowchart illustrating a flow of processing executed by the server apparatus accompanying an increase or decrease in the number of users.

The processing illustrated in FIG. 6 is activated in both of Step S306 in a processing flow shown in FIG. 5 which is executed when a new user enters the office 60 and Step S904 in a processing flow shown in FIG. 18 (which will be described below) which is executed when a user exits the office 60.

First, it is determined whether or not a user is present in the office 60 (Step S401). This is because the processing flow shown in FIG. 6 is executed even when the last one user exits the office 60. When it is determined that there is no user present in the office 60, the processing proceeds to Step S402 and it is determined whether the self-traveling printer 20 (refer to FIGS. 1 and 2) is present at the home position in FIG. 2 where the self-traveling printer 20 is illustrated by solid lines. When the self-traveling printer 20 is not present at the home position, the self-traveling printer 20 is instructed to move to the home position (Step S403).

When there is a user present in the office 60 (Step S401), a movement distance is calculated for each of three stand-by positions in FIG. 2 on the basis of an average movement distance of the self-traveling printer 20 between the stand-by positions and all of the users present in the office (Step S404). A method of calculating the movement distance in Step S404 will be described below. Note that, the movement speed of the self-traveling printer 20 is substantially constant and thus the movement distance is proportional to the traveling time of the self-traveling printer 20.

Next, it is determined whether or not conditions for a moving around mode are satisfied (Step S405). When the conditions for the moving around mode are satisfied, processing in the moving around mode (which will be described below with reference to FIG. 9) is activated (Step S406). The moving around mode will be also described below.

Thereafter, the priority stand-by position is selected (Step S407). Here, a stand-by position with the shortest movement distance that is calculated in Step S404 is selected as the priority stand-by position. Then, it is determined whether the current selected priority stand-by position is the same as the present priority stand-by position (Step S408), and when it is determined that the current selected priority stand-by position is different from the present priority stand-by position, the self-traveling printer 20 is instructed to move to the current selected new priority stand-by position (Step S409).

FIG. 7 is a table illustrating numbers given to respective seats in the office and movement distances between the seats and stand-by positions. The table in FIG. 7 is a portion of the map data of the office 60 which is stored in the server apparatus 40.

In the table in FIG. 7, distances a1, a2, a3, . . . and so forth, b1, b2, b3, . . . and so forth and c1, c2, c3, . . . and so forth, which are distances between the seat numbers 001, 002, 003, . . . and so forth and the stand-by positions 1, 2, and 3 along a moving route of the self-traveling printer 20, are stored. In addition, in the table in FIG. 7, distances d1, d2, d3, . . . and so forth, which are distances between the seat numbers 001, 002, 003, . . . and so forth and the multifunction machine 30 along a moving route of the self-traveling printer 20, are stored. The distances d1, d2, d3, . . . and so forth, which are distances between the seat numbers 001, 002, 003, . . . and so forth and the multifunction machine 30, correspond to an example of "respective weightings of the user locations" in the present invention.

In addition, FIG. 8 is a table illustrating a correspondence relationship among IDs of users present in the office 60, seat numbers of the users, and respective "weightings" of the users. The table in FIG. 8 is a portion of the user database stored in the server apparatus 40. The respective "weightings" of the users are values which are determined by an administer of the system on the basis of difference in fee for using the office 60 (for example, non-VIP members and VIP members) or are determined on the basis of the number of past printings in the case of a system in which the user pays for the services on the basis of the number of printings.

Hereinafter, a method of calculating the movement distance in Step S404 of FIG. 6 will be described with reference to FIGS. 7 and 8. Here, as an example of the method of calculating the movement distance, a method will be described in which the movement distance for the stand-by position 1 is calculated on the assumption that the number of users present in the office 60 is four. The user IDs of the four users are 010, 013, 022, and 035 which are shown in FIG. 8.

The basic concept of this calculating method is that an average distance between each stand-by position (here, the stand-by position 1) and each seat of a user along the moving route of the self-traveling printer 20 is calculated. For a user sitting on a seat in the vicinity of the multifunction machine 30, in order to prompt the user to use the multifunction machine 30, a calculating method is used in which a calculated distance between a stand-by position distant from the multifunction machine 30 and the user is small when other conditions are the same. In addition, for a user with a large weighting, a calculating method is used in which the smaller a calculated distance is the closer to the user the stand-by position is. Specifically, the distance is calculated as follows, for example.

Since the seat numbers of the four users present in the office with user IDs 010, 013, 022, and 035 are respectively 009, 021, 033, and 002, distances between the seat numbers and the stand-by position 1 are referred to as distances a9, a21, a35, and a2, respectively.

In addition, similarly, distances between the seat numbers and the multifunction machine 30 are referred to as distances d9, d21, d35, and d2, respectively.

At this time, an average movement distance to the stand-by position 1 is calculated using the following equation.

Average movement distance to stand-by position
1={(a9−d9)+(a21×10−d21)+(a35−d35)+(a2×2−d2)×2+C}/(1+10+1+2)

In the equation, C is a constant which prevents the calculation result from being a negative value.

That is, in this equation, since weightings given to the users of the user IDs 013 and 035 are respectively 10 and 2, stand-by positions close to the users with the user IDs 013 and 035 are ten times and two times more likely to be selected as the priority stand-by position, respectively. In addition, the distances between the positions of the user seats and the multifunction machine 30 are subtrahends. Therefore, in a case where the seat is close to the multifunction machine 30, the subtrahend is small and in a case where the seat is distant from the multifunction machine 30, the subtrahend is large. That is, when other conditions are the same, a stand-by position distant from the multifunction machine 30 is given a small value and is likely to be selected as the priority stand-by position.

Note that, the above exemplified calculating methods are merely examples, and the system may be a system in which a weighting is not given to each user or a system in which a weighting is not given to each user location.

(Moving Around Mode)

Regarding the determination on whether the conditions for the moving around mode are satisfied in Step S406 of FIG. 6, it is determined that the conditions for the moving around mode are satisfied in a case where respective average movement distances with respect to the stand-by positions 1, 2, and 3 calculated as above are the substantially same and are close to each other, in the exemplary embodiment. Specifically, when it is assumed that the respective average movement distances with respect to the stand-by positions 1, 2, and 3 are A1, A2, and A3, an average A of A1, A2, and A3 is A, (A1+A2+A3)/3, and predetermined two threshold values are Th1 and Th2 (Th1<Th2), it is determined that the conditions for the moving around mode are satisfied in a case where the following expressions are satisfied.

$$Th1<|A-A1|<Th2$$

$$Th1<|A-A2|<Th2$$

$$Th1<|A-A3|<Th2$$

In these expressions, "|...|" indicates an absolute value of "...". Since it is difficult to decide which of the three stand-by positions 1, 2, and 3 is more suitable, the self-traveling printer 20 moves around instead of standing by at one place. Even in the moving around mode, in Step S405, a stand-by position with the smallest of the average movement distances A1, A2, and A3 calculated for the three stand-by positions 1, 2, and 3 is selected as the priority stand-by position and the selected priority stand-by position functions as the starting point of the moving around.

Figure 9:
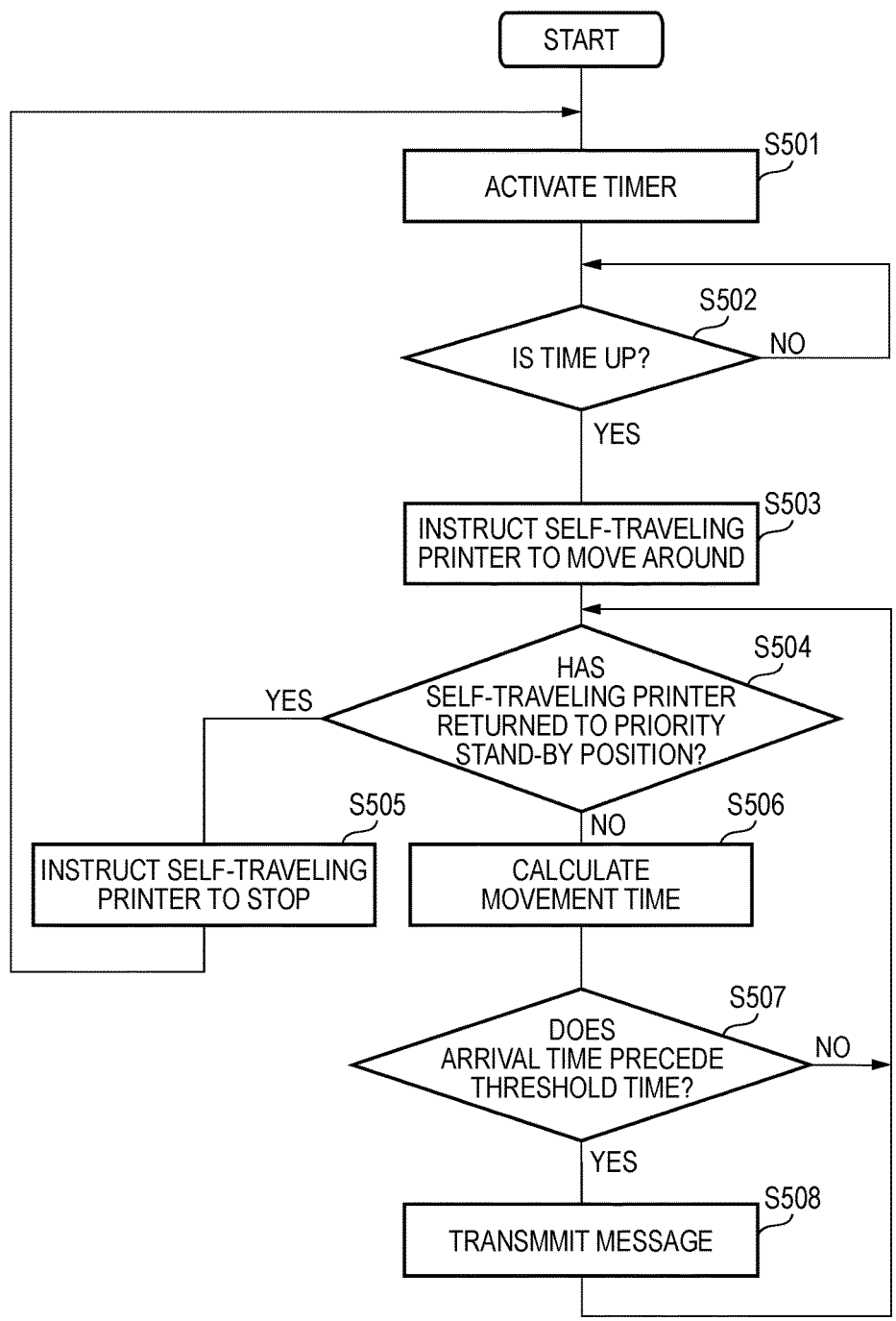
FIG. 9 is a flowchart illustrating a flow of processing executed by the server apparatus in a moving around mode.

FIG. 9 is a flowchart illustrating a flow of processing executed by the server apparatus in a moving around mode. Even in the moving around mode, the self-traveling printer 20 first moves to the priority stand-by position according to the instruction in Step S409 of FIG. 6.

When processing in the moving around mode shown in FIG. 9 is started, a timer is activated first (Step S501), and time is measured for a predetermined time until time is up (Step S502). When the time is up, the self-traveling printer 20 is instructed to move around (Step S503). A moving around route is stored in the server apparatus 40 as a portion of the map data of the office 60. Alternatively, the moving around route may be adjusted according to the positions of the seats of the users present in the office.

After the self-traveling printer 20 is instructed to move around, it is monitored whether the self-traveling printer 20 has returned to the priority stand-by position after moving around the office once (Step S504), and the self-traveling printer 20 is instructed to stop when the self-traveling printer 20 has returned to the priority stand-by position (Step S505).

During the moving around, how many minutes are left until arrival of the self-traveling printer 20 to each user is calculated (Step S506) and when the calculated arrival time for a certain user precedes a threshold time (Step S507), a message which prompts the user to perform the printing out is transmitted to the client apparatus 10 (Step S508).

Figure 10:
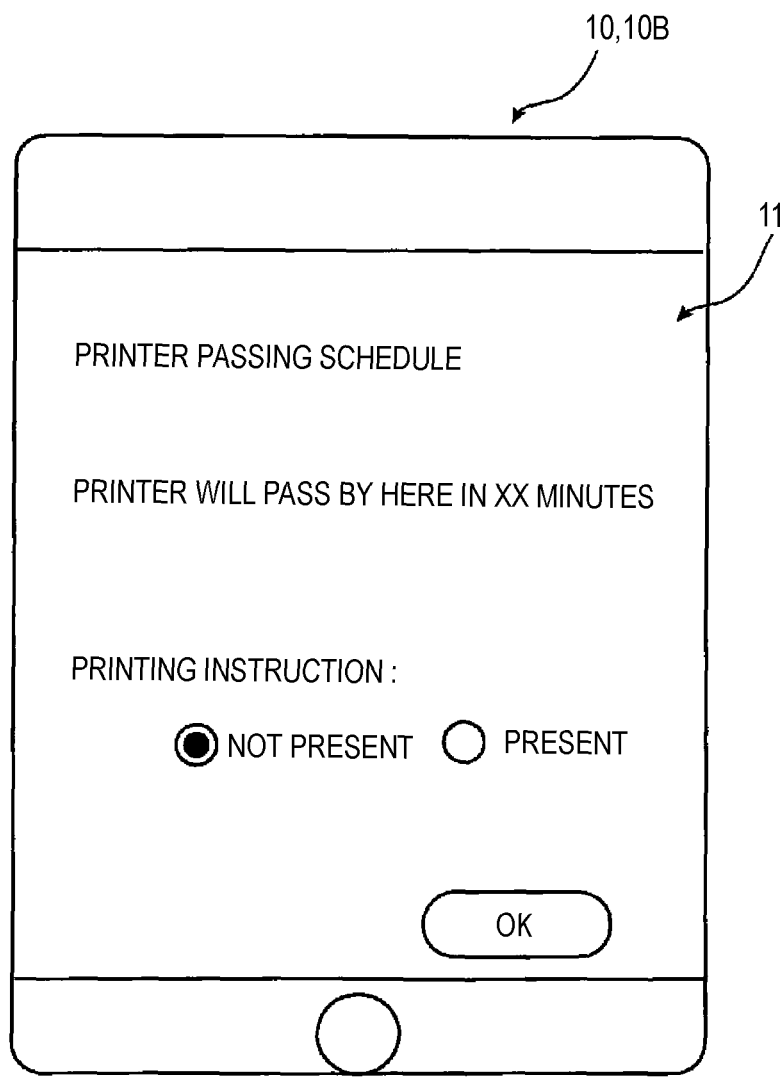
FIG. 10 is a diagram illustrating a message screen which is displayed on a display screen of the client apparatus when the client apparatus receives a message in Step S508 of FIG. 9.

FIG. 10 is a diagram illustrating a message screen which is displayed on a display screen of the client apparatus when the client apparatus receives a message in Step S508 of FIG. 9.

Figure 12:
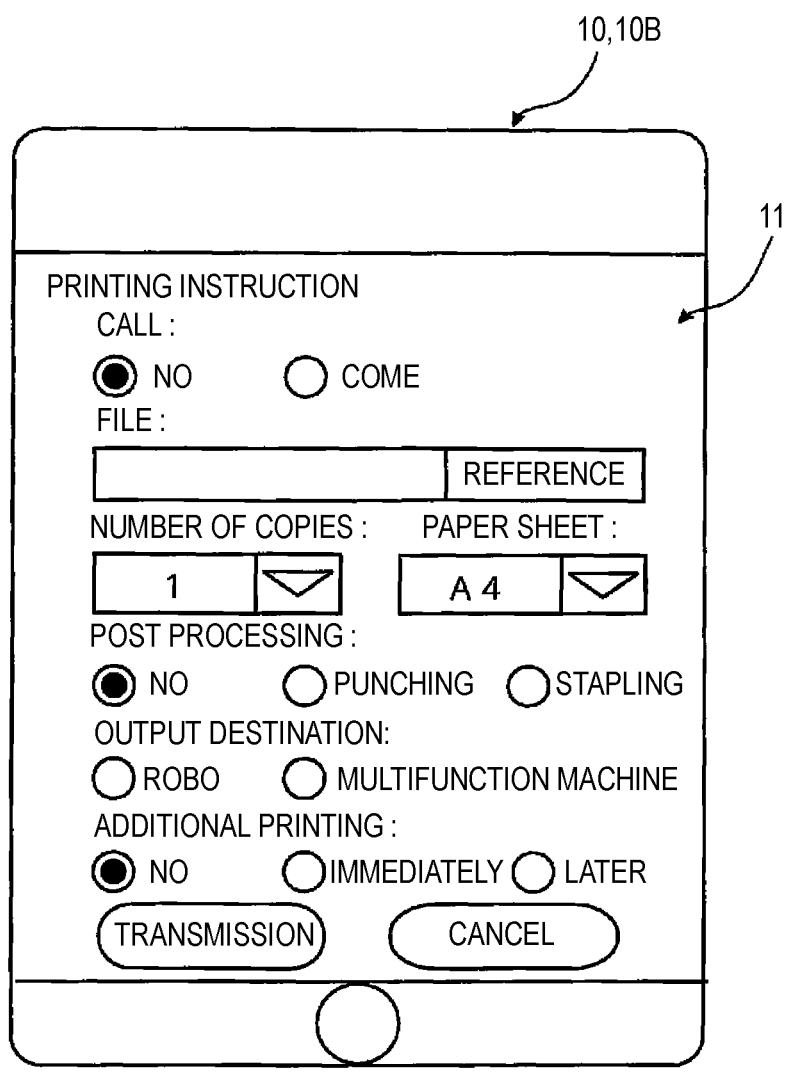
FIG. 12 is a diagram illustrating a printing instruction screen which is displayed on the display screen of the client apparatus.

Here, the user is prompted to use the self-traveling printer 20 (to issue instruction to perform the printing out) being notified that the self-traveling printer 20 will pass the user soon. When "PRESENT" of the printing instruction of the message screen shown FIG. 10 is selected and the "OK" button is pushed, a printing instruction screen as shown in FIG. 12 (which will be described below) is displayed.

The description will be made returning to FIG. 9.

After the self-traveling printer 20 moves around once while transmitting the message as shown in FIG. 10 to the client apparatus of each user, the self-traveling printer 20 returns to the priority stand-by position. When the self-traveling printer 20 returns to the priority stand-by position, the self-traveling printer 20 stays at the priority stand-by position for a while, and the self-traveling printer 20 moves around again when the timer is activated and the time is up again.

(Printing Out (Job) Instruction)

Next, a situation in which an instruction to perform the printing out is issued after the login will be described.

Figure 11:
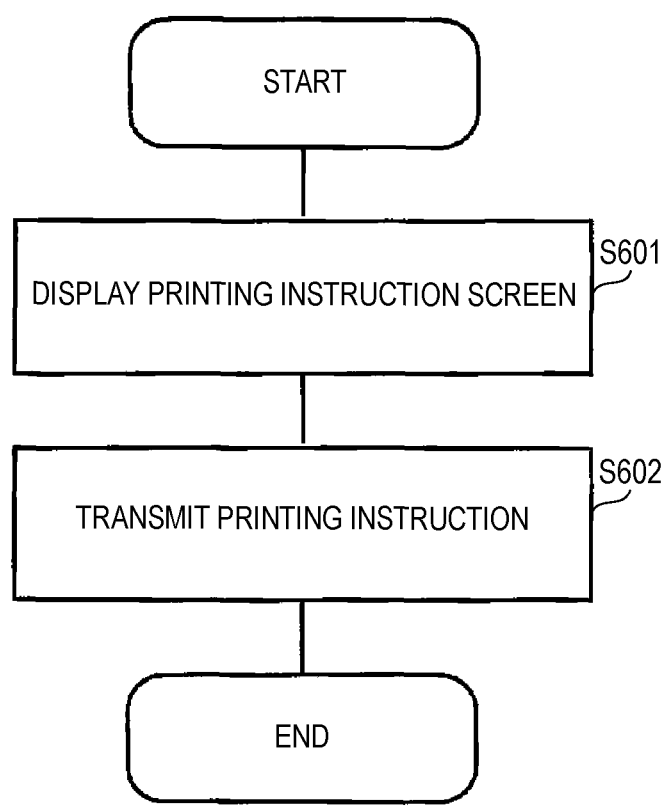
FIG. 11 is a flowchart illustrating a flow of processing in the client apparatus in a case where a user issues an instruction to perform printing out.

FIG. 11 is a flowchart illustrating a flow of processing in the client apparatus in a case where a user issues an instruction to perform printing out.

FIG. 12 is a diagram illustrating a printing instruction screen which is displayed on the display screen of the client apparatus.

When issuing a printing out instruction, a user operates the user's own client apparatus 10 so that the printing instruction screen as shown in FIG. 12 is displayed on the display screen 11 of the client apparatus 10 (Step S601). Then, the user fills a field of "CALL" or fields below "FILE" on the printing instruction screen.

Here, the "CALL" is a field with which a user instructs the self-traveling printer 20 to come to the seat of the user before issuing an instruction to perform the printing out although the user has not decided whether to issue an instruction to perform the printing out yet. In the initial setting, "NO" is set which means that the user does not call the self-traveling printer 20. When "COME" in the field of "CALL" is specified and a "TRANSMISSION" button is pushed, regardless of input contents of the other fields on the printing instruction screen in FIG. 12, the self-traveling printer 20 starts to move to the seat of the user.

In addition, a field of "FILE" is a field for specifying a data file for the printing out in which image data or character data to be printed out is stored. In addition, "NUMBER OF COPIES" is a field for specifying the number of copies to be printed out of the file. In the initial setting, "ONE" is set. In addition, "PAPER SHEET" is a field for specifying the size of a paper sheet used in the printing out. In the initial setting, "A4" is set. In addition, "POST PROCESSING" is a field for setting whether to perform or not a punching operation or a stapling operation. In the initial setting, "NO" is set which means that no post processing is performed. Furthermore, "OUTPUT DESTINATION" is a field for specifying whether to instruct the self-traveling printer 20 to perform the current printing out or to instruct the multifunction machine 30 to perform the current printing out. Here, "ROBO" is a nickname of the self-traveling printer 20. When "PAPER SHEET" is "A4" and "POST PROCESSING" is "NO", both "ROBO" (self-traveling printer) and "MULTIFUNCTION MACHINE" can perform the printing out. Therefore, neither of "ROBO" and "MULTIFUNCTION MACHINE" is automatically selected and any one of "ROBO" and "MULTIFUNCTION MACHINE" is selected according to a user operation. When "PAPER SHEET" is other than "A4", or when "POST PROCESSING" is other than "NO", since "ROBO" cannot respond to the requests, "MULTIFUNCTION MACHINE" is automatically selected and "ROBO" becomes unavailable. Even for a job which can be printed out by even "ROBO" (self-traveling printer), when the number of printings is equal to or greater than a threshold value, "MULTIFUNCTION MACHINE" may be automatically selected.

"ADDITIONAL PRINTING" is a field which is set when the current scheduled printing out is so called "test printing" and the subsequent printing out is intended to be performed. In the initial setting, "NO" is set which means that no additional printing is scheduled. "IMMEDIATELY" is selected when it is scheduled to issue an instruction to perform the additional printing immediately after confirming printed matter output according to the current printing out instruction. "LATER" is selected when it is scheduled to issue an instruction to perform the additional printing after a brief interval such as when it is scheduled to perform the additional printing after confirming the current printed matter and revising or correcting the printed matter.

On the printing instruction screen of FIG. 12, the "TRANSMISSION" button is pushed after setting "COME" in the field of "CALL" or inputting instructions for printing out in the fields below "FILE". Then, the instructions input on the printing instruction screen are transmitted to the server apparatus 40 along with the user ID (Step S602 in FIG. 11).

Figure 13:
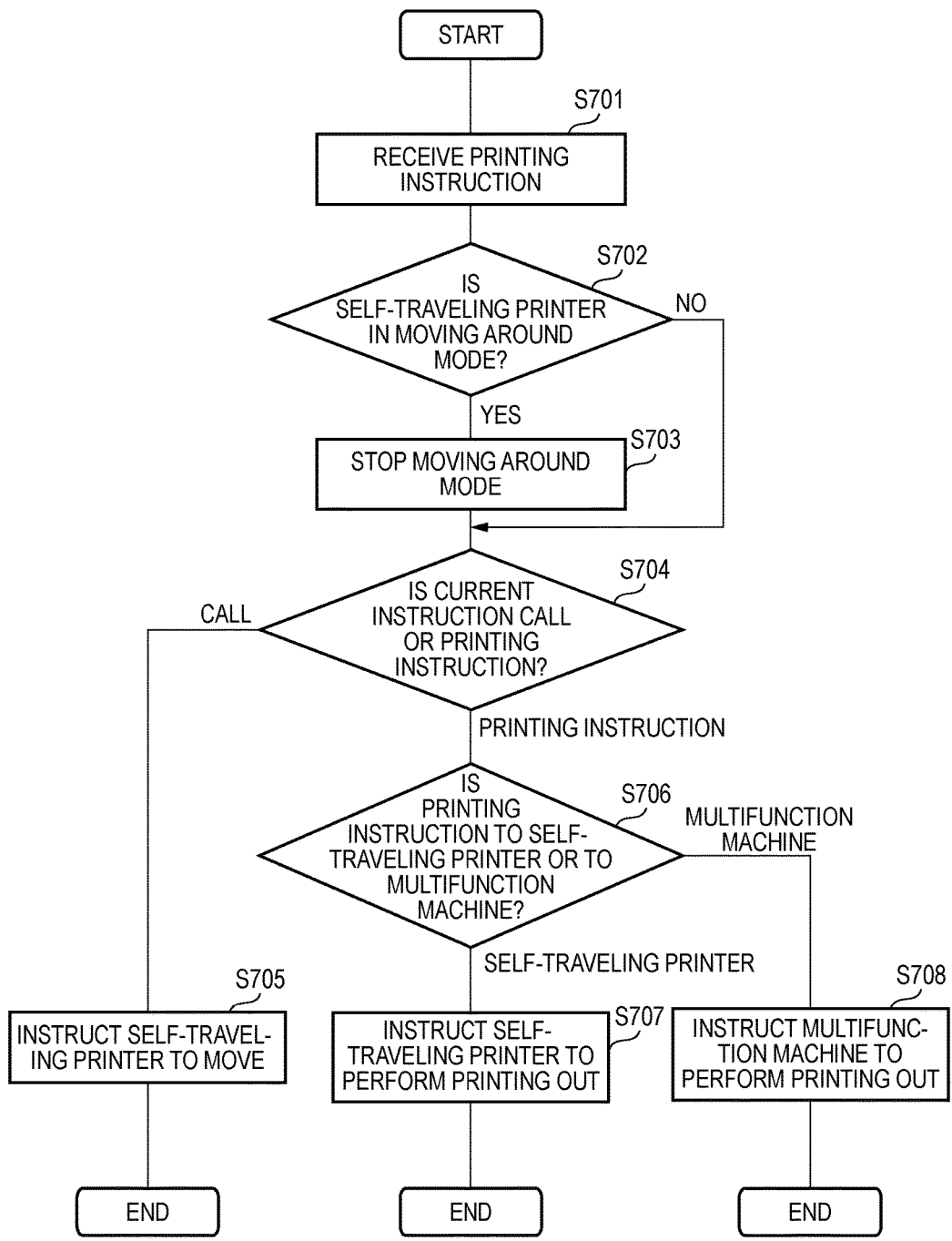
FIG. 13 is a flowchart illustrating a flow of processing in the server apparatus in a case where the server apparatus receives an instruction to perform printing out from the client apparatus.

FIG. 13 is a flowchart illustrating a flow of processing in the server apparatus in a case where the server apparatus receives an instruction to perform printing out from the client apparatus.

When the server apparatus 40 receives an instruction to perform the printing out from the client apparatus 10 (Step S701), the server apparatus 40 examines whether the self-traveling printer 20 is in the moving around mode at that time (Step S702). When it is determined that the self-traveling printer 20 is in the moving around mode, the server apparatus 40 stops the moving around mode (Step S703).

Thereafter, it is determined whether the current instruction is "CALL" which precedes the printing instruction or "printing instruction" (Step S704). When the current instruction is "CALL", the self-traveling printer 20 is instructed to move to the user who issues an instruction of "CALL" (Step S705). On the other hand, when the current instruction is "printing instruction", according to whether the instruction is a printing instruction to "ROBO" (self-traveling printer 20) or a printing instruction to "MULTIFUNCTION MACHINE" (Step S706), files for the current printing out are transmitted to "ROBO" (self-traveling printer 20) or "MULTIFUNCTION MACHINE" and "ROBO" or "MULTIFUNCTION MACHINE" is instructed to perform the printing out (Steps S707 and S708). Furthermore, when the instruction is the printing instruction to "ROBO" (self-traveling printer 20), "ROBO" (self-traveling printer 20) is notified of the position of the seat of the user who issues the instruction to perform the printing out. Then, "ROBO" (self-traveling printer 20) moves to the notified position of the seat, and executes the printing out after performing a user authenticating process using the IC card. When "MULTIFUNCTION MACHINE" is instructed to perform the printing out, the user moves to the multifunction machine 30 and receives printed matter output from the multifunction machine 30 after going through the user authenticating process using the IC card.

Figure 14:
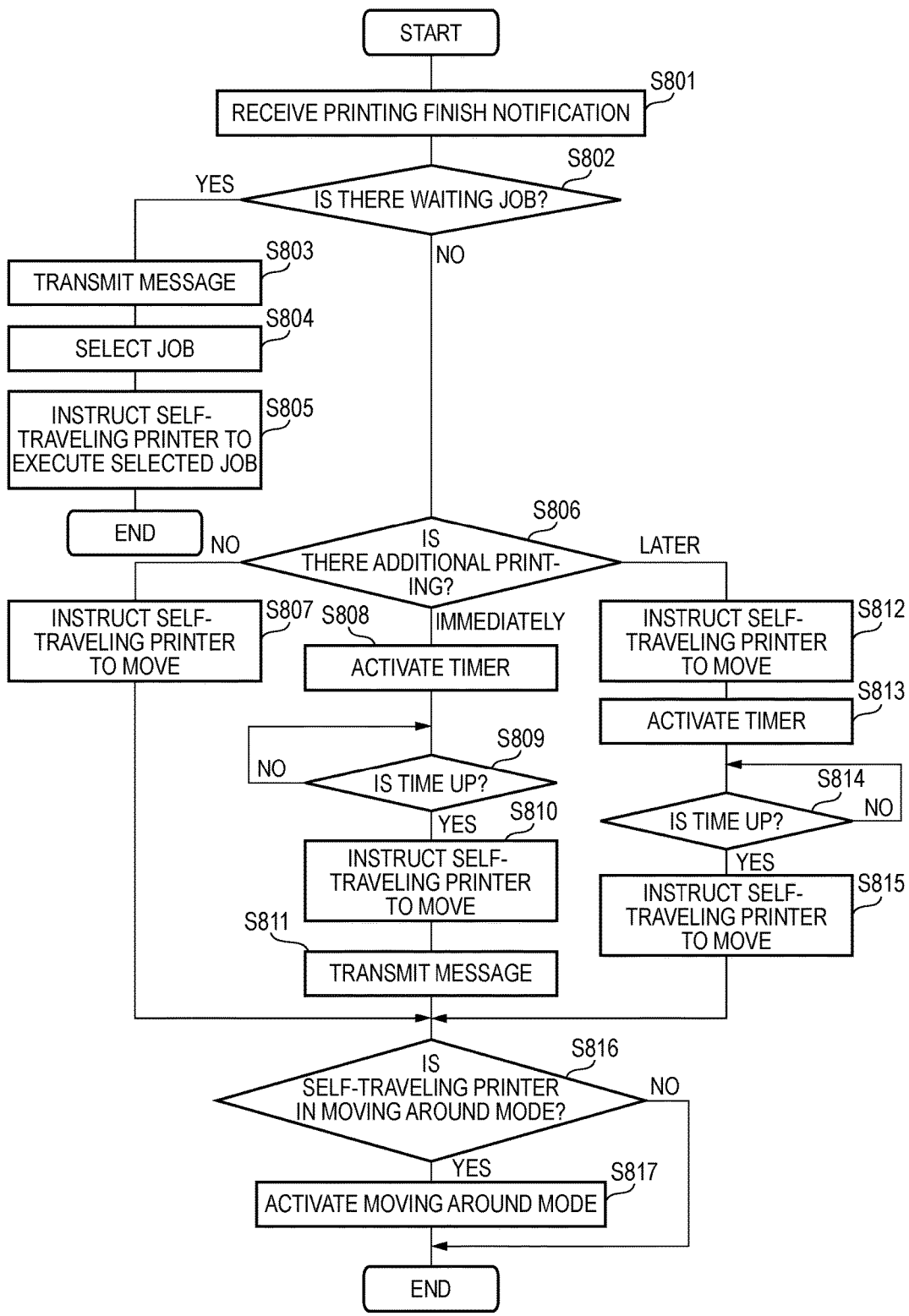
FIG. 14 is a flowchart illustrating a flow of processing which is executed by a server when printing out performed by a self-traveling printer ends.

FIG. 14 is a flowchart illustrating a flow of processing which is executed by a server when the printing out performed by the self-traveling printer ends.

When printing out of one job is finished, the self-traveling printer 20 notifies the server apparatus 40 that the printing out is finished. Then, in the server apparatus 40 the processing shown in FIG. 14 is executed.

Here, when the server apparatus 40 receives a printing finish notification from the self-traveling printer 20 (Step S801), it is determined whether there is a waiting job or not (Step S802). The waiting job refers to a job which the self-traveling printer 20 is instructed to print out but is not started and is in a stand-by state since another job is being executed by the self-traveling printer 20.

When there is a waiting job, the client apparatus 10 of a user who has finished the current printing out is notified of a message indicating movement for executing next job (Step S803).

Figure 15:
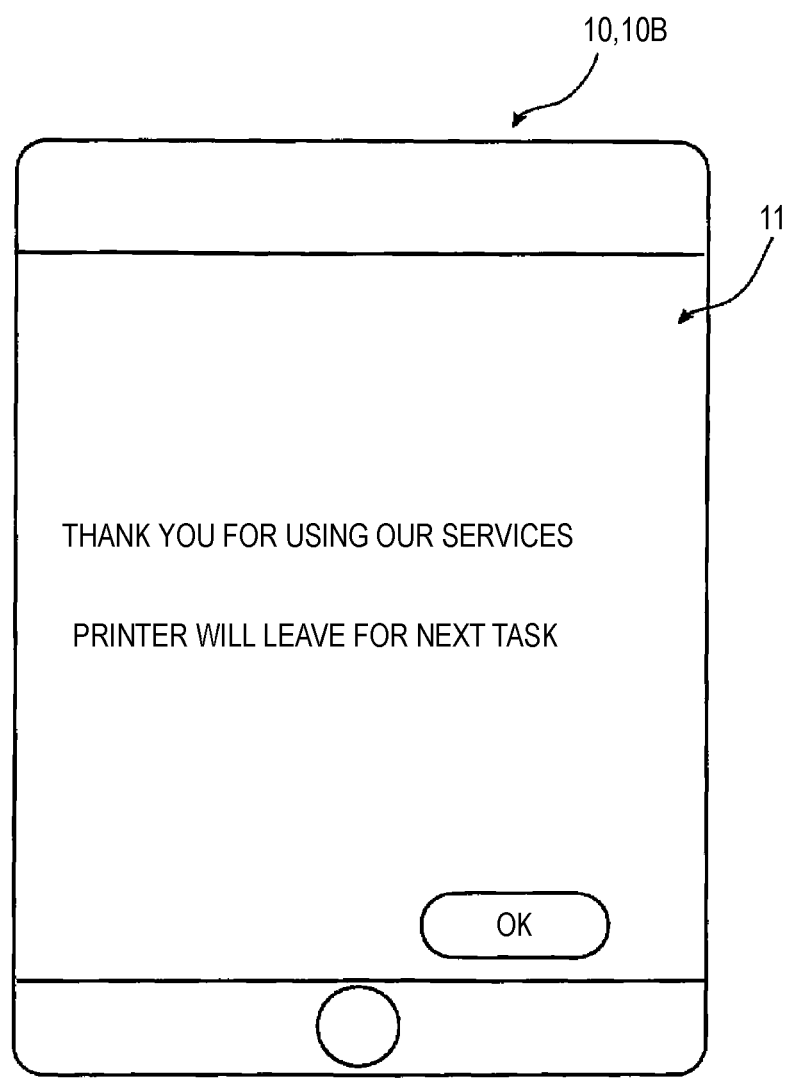
FIG. 15 is a diagram illustrating a message screen which is displayed on the display screen of the client apparatus when the client apparatus receives a notification in Step S803 of FIG. 14.

FIG. 15 is a diagram illustrating a message screen which is displayed on the display screen of the client apparatus when the client apparatus receives the notification in Step S803 of FIG. 14.

Here, a message of appreciation for use of the services and a message indicating that the printer will move to perform the next task.

The description will be made returning to FIG. 14.

After the message transmission in Step S803, selection of a job to be executed next is performed (Step S804). When there is only one waiting job, inevitably, the waiting job is selected as a job to be executed next. When there is plural waiting jobs, in the exemplary embodiment, a job to be executed next is selected as follows.

FIGS. 16A and 16B are diagrams for explaining a selection algorithm of a job to be executed next. Here, FIG. 16A is a table in which jobs are arranged in the order of printing out instruction.

User A is a user who has finished the current printing out. User B is a user who has issued an instruction after the user A. User C is a user who has issued an instruction to perform the printing out after the user B. At a point in time at which the current printing out of the user A is finished, two of a job of the user B and a job of the user C become waiting jobs.

In addition, "DISTANCE" is a distance along the moving route of the self-traveling printer 20 between a previous user and a next user. The self-traveling printer 20 is positioned close to the user A at the present time and is 9.0 m (meters) distant from a seat of the user B. In addition, the seat of the user B is 5.0 m distant from the sear of the user C. Here, it is assumed that a seat of the user C is positioned in a substantially middle position between a seat of the user A and the seat of the user B.

Here, when executing the printing out operations in the order of printing out instruction, after finishing the printing out of the user A, the self-traveling printer 20 passes the user C to move to the user B and executes the job of the user B. Thereafter, the self-traveling printer 20 returns to the user C and executes the job of the user C. In this case, the movement distance of the self-traveling printer 20 is 9.0 m+5.0 m=14.0 m.

On the other hand, in the exemplary embodiment, a job to be executed next is selected such that the total movement distance of the self-traveling printer 20 becomes short, regardless of the order of printing out instructions.

FIG. 16B is a table in which waiting jobs are rearranged such that the movement distance of the self-traveling printer 20 becomes short.

The self-traveling printer 20 which is positioned close to the user A at the present time moves to the user C first, and executes the printing out according to the instruction of the user C. Then, the self-traveling printer 20 moves to the user B and executes the printing out according to the instruction of the user B. In this case, the movement distance of the self-traveling printer 20 is 5.0 m+4.0 m=9.0 m. Accordingly, the movement distance of the self-traveling printer 20 becomes short.

Accordingly, here, the job of the user C is selected as a job to be executed next.

The description will be made returning to FIG. 14.

After a job to be executed next is selected as above in Step S804 of FIG. 14, the self-traveling printer 20 is instructed to execute the selected job (Step S805). Then, the self-traveling printer 20 starts to move to a user (the user C in an example shown in FIG. 15) who issues the instruction to execute the selected job (printing out).

When it is determined that there is no waiting job in Step S802, it is determined whether any of "NO", "IMMEDIATELY", and "LATER" is specified as "ADDITIONAL PRINTING" when the user issues the instruction to execute the job which is finished in the current printing out (the job of the user A in a case where there is no waiting job (the jobs of the users B and C) in an example shown in FIG. 15) (Step S806).

When "NO" is specified as "ADDITIONAL PRINTING", the self-traveling printer 20 is instructed to move to the priority stand-by position (Step S807). Thereafter, it is determined whether the moving around mode is stopped or not (refer to Step S703 of FIG. 13) (Step S816). When it is determined that the moving around mode is stopped, the moving around mode (processing shown in FIG. 9) is activated (Step S817).

When "IMMEDIATELY" is specified as "ADDITIONAL PRINTING", since there is no waiting job (next job) at this time and it is expected that an additional printing instruction will be issued in a short time, the self-traveling printer 20 stays close to the user (the user A in the example shown in FIG. 15) who has performed the current printing out until a time-up timing of a timer which will be described below. That is, when "IMMEDIATELY" is specified, the timer is activated (Step S808), and when the time is up (Step S809), a message is transmitted to the client apparatus 10 of the user (Step S810) and the self-traveling printer 20 is instructed to move to the priority stand-by position (Step S811). Then, a process of restarting the moving around mode is performed (Steps S816 and S817).

Figure 17:
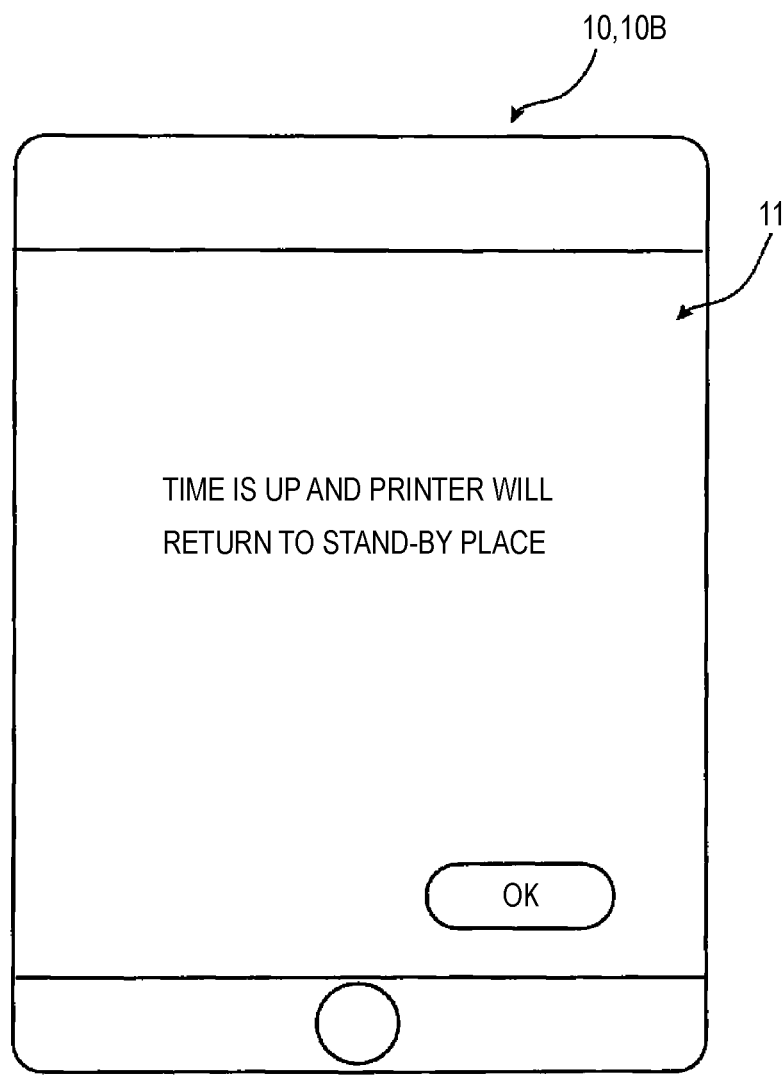
FIG. 17 is a diagram illustrating a message screen which is displayed on the display screen of the client apparatus when the client apparatus receives a message in Step S810 of FIG. 14.

FIG. 17 is a diagram illustrating a message screen which is displayed on the display screen of the client apparatus when the client apparatus receives a message in Step S810 of FIG. 14.

The message screen indicates that the time is up and the printer will move.

When a printing instruction is issued before the time is up, the processing shown in FIG. 14 is canceled and processing according to the new printing instruction (refer to FIG. 13) is started. It is also conceivable that a printing instruction is issued by a user other than a user who is expected to issue an instruction to perform the additional printing before the time is up. Even in this case, the processing shown in FIG. 14 is canceled and the printing instruction becomes valid. In this case, although not illustrated here, a message indicating that another user has issued an instruction may be transmitted to a user waiting for the additional printing.

When it is determined that "LATER" is specified as "ADDITIONAL PRINTING" in Step S806 of FIG. 14, the self-traveling printer 20 is instructed to move to a stand-by position most close to the user who has finished the current printing out (Step S812). The stand-by position most close to the user and the priority stand-by position may be the same, and are not necessarily the same. The subsequent processing (Steps S813 to S815) is the same as that in the case of "IMMEDIATELY" (Steps S808 to S811).

Since the self-traveling printer 20 stays close to the user with scheduled additional printing for a while, the traveling time of the self-traveling printer 20 is likely to be short, and it is possible to improve the service quality.

(Logout)

Figure 18:
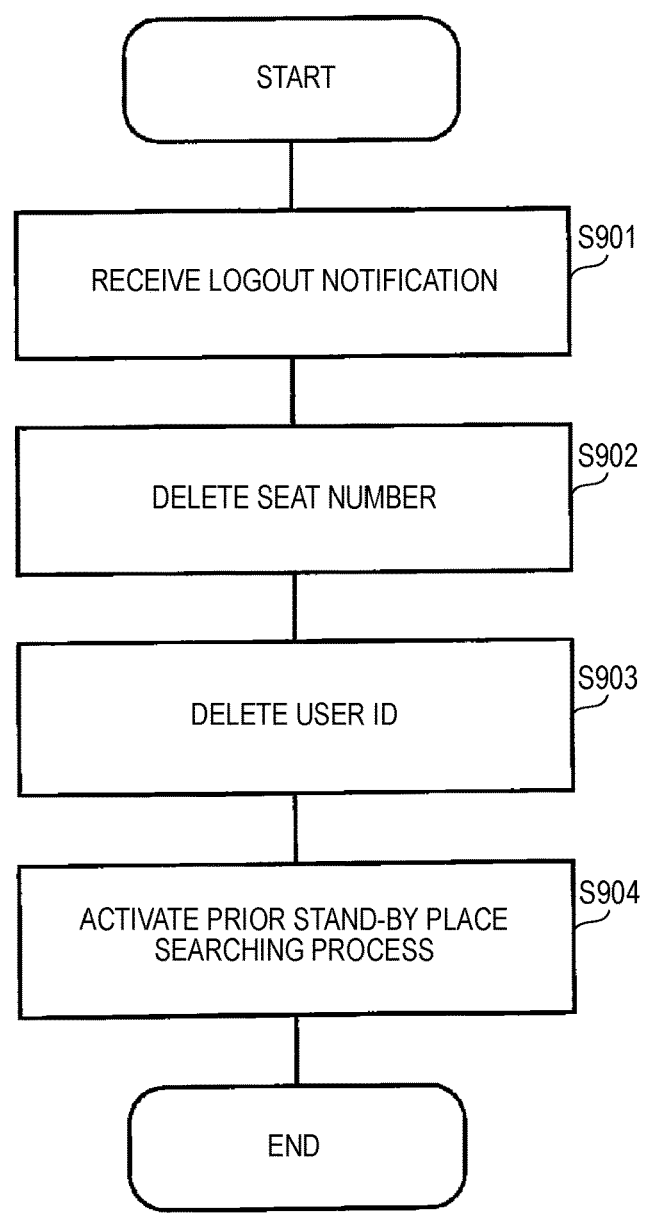
FIG. 18 is a flowchart illustrating a flow in processing in the server apparatus when a user logs out.

FIG. 18 is a flowchart illustrating a flow in processing in the server apparatus when a user logs out.

Figure 19:
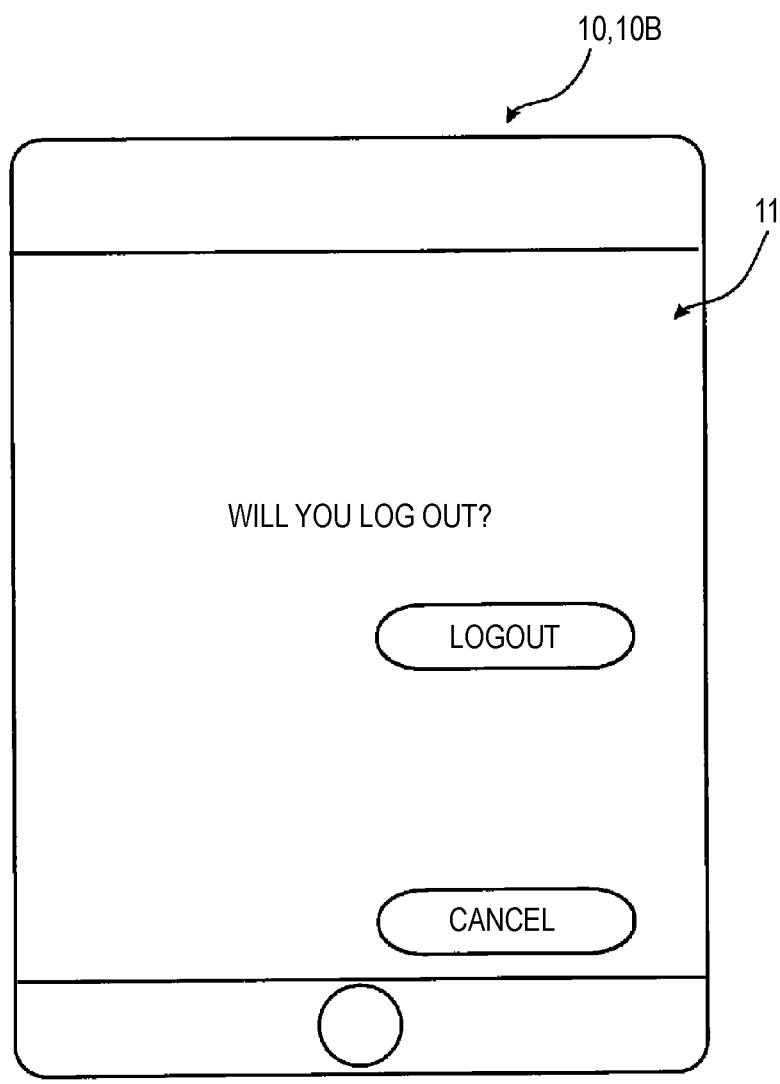
FIG. 19 is a diagram illustrating a logout screen which is displayed on the display screen of the client apparatus when a user logs out.

In addition, FIG. 19 is a diagram illustrating a logout screen which is displayed on the display screen of the client apparatus when a user logs out.

When a user finishes today's task in the office 60 (refer to FIG. 2), the user performs a logout operation using the user's own client apparatus 10. In the logout operation, the logout screen shown in FIG. 19 is displayed with the client apparatus 10 operated by the user and a "LOGOUT" button on the logout screen is pushed.

When the server apparatus 40 receives a notification that the "LOGOUT" button is pushed (Step S901), the server apparatus 40 deletes the current seat number of the user (Step S902), and deletes the user ID which is assigned to the user when the user enters the office (Step S903). After the logout operation, the user returns the IC card to a reception and exits the office 60.

In the server apparatus 40, after the user ID is deleted, "priority stand-by position searching process" (refer to FIG. 6) is activated (Step S904). This is because the priority stand-by position may be changed when the user exits the office.

In the exemplary embodiment, as described above, the self-traveling printer 20 stands by at the priority stand-by position which is selected such that the priority stand-by position is close to the user present in the office. Therefore, the traveling time of the self-traveling printer 20 to the user when there is a printing out instruction is shortened and the provision of service becomes efficient.

Next, a situation in which remaining power of the built-in battery of the self-traveling printer 20 is low will be described. When remaining power of the built-in battery is low, the self-traveling printer 20 notifies the server apparatus 40 that the remaining power is low. Then, the server apparatus 40 instructs the self-traveling printer 20 to move to the home position. When there is a job which is in the middle of the printing out or a job which has not yet been printed out in the self-traveling printer 20, the multifunction machine 30 is instructed to process the job and a message indicating that the multifunction machine 30 will process the job since the battery power of the self-traveling printer 20 is low is transmitted to the client apparatus 10 of the user who issues an instruction to execute the job. Thereafter, until the built-in battery of the self-traveling printer 20 is sufficiently charged, specifying "ROBO" (the self-traveling printer 20) as "OUTPUT DESTINATION" on the printing instruction screen (refer to FIG. 12) is prohibited. When the built-in battery of the self-traveling printer 20 is sufficiently charged, the self-traveling printer 20 moves to the priority stand-by position and stands by at the priority stand-by position.

(Others)

In the exemplary embodiment, the home position is not used as the stand-by position. However, the home position may also be used as one of the stand-by positions.

In addition, in the exemplary embodiment, plural discrete places are set as the stand-by positions. However, a configuration in which a stand-by section is set and any area in the stand-by section can be used as the stand-by position may be adopted. Even in this case, similar to the exemplary embodiment, a place of which a result in the above-described calculation is the smallest in the stand-by section is selected as the priority stand-by position.

In addition, in the exemplary embodiment, the moving around mode is described as a mode which is selected in a case where it is difficult to decide which of the plural stand-by positions is more suitable. However, the self-traveling printer 20 may move around to move to each of the users present in the office regardless of suitability of the plural stand-by positions. For example, there may be provided a system with plural self-traveling printers 20 in which one of the plural self-traveling printers 20 moves around in the office at all times and the others of plurality of self-traveling printers 20 stand by at the priority stand-by position.

In addition, the printing system 100 in the exemplary embodiment is described as a system in which a user receives an IC card with a one-time user ID recorded thereon when the user enters the office 60 and the user returns the IC card when the user exits the office. However, a system may also be adopted in which a fixed ID is given to each of users who have a right to use the office 60 and each user stores the IC card even after exiting the office.

In this case, in terms of improving the security, a configuration may be adopted in which, when the server apparatus 40 receives a printing instruction, a one-time password which is valid for only the current printing out is transmitted to the client apparatus 10 which issues an instruction to perform the printing out, and an user is required to input the one-time password during the authenticating process before the printing out. Alternatively, a configuration in which biometric information such as facial features or fingerprints of a user is registered in advance and the authenticating process is performed using the biometric information may be adopted.

In addition, here, the description has been made using the printing system 100 with the server apparatus 40 which is shown in FIG. 1 as an example. However, the present invention may be applied to a printing system which does not include the server apparatus 40 and in which the client apparatus 10, the self-traveling printer 20, and the multifunction machine 30 communicate with each other directly, and to a printing system which does not include the server apparatus 40 and in which the client apparatus 10 and the self-traveling printer 20 communicate with each other directly. In this case, the self-traveling printer 20 or the multifunction machine 30 may has a role as the server apparatus 40 in addition to the above-described role as the self-traveling printer 20 or the multifunction machine 30. In the case of a system with plural self-traveling printers, any one of the plural self-traveling printers 20 may function as the server apparatus 40 or the plural self-traveling printers 20 may share a role as the server apparatus 40. Such a system without the server apparatus 40 includes only one self-traveling printer 20 or includes one self-traveling printer 20 and one multifunction machine, and thus the system is suitable to be used as a small-scale printing system. A change from the printing system 100 with the server apparatus 40 which is described in the exemplary embodiment to the printing system 100 without the server apparatus 40 is an obvious matter, and thus description thereof will be omitted.

In addition, here, as an example of the service providing system of the present invention, a printing system which includes a self-traveling printer and in which the self-traveling printer performs printing out at the movement destination has been described. However, the present invention is not necessarily limited to a printing system. The present invention can be applied to any of systems which include a mobile apparatus and provide services such as a system which includes a delivery device that delivers documents or articles as the mobile apparatus, a system which includes a care robot as the mobile apparatus, or the like.

Note that, the information processing device, which functions as the control device in the exemplary embodiments of the present invention when the control program according to the present invention is executed, may be built into the mobile apparatus according to the present invention or may be provided integrally with the mobile apparatus. Instead, the information processing device may constitute the server apparatus in the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile apparatus that travels within a predetermined service provision area, the mobile apparatus comprising a controller configured to control the mobile apparatus to:
   in response to receiving an instruction to provide a service from at least one user present in the service provision area, travel to the at least one user to provide the service to the at least one user; and
   after providing the service to the at least one user, moving to a priority stand-by position, which is determined from a plurality of stand-by positions provided within the service provision area based on a location of the at least one user, and waiting for a subsequent instruction to provide a service.

2. The mobile apparatus according to claim 1, wherein the priority stand-by position is determined from the plurality of stand-by positions such that a traveling time or a traveling distance from the priority stand-by position to the at least one user is shortest.

3. The mobile apparatus according to claim 1, wherein the at least one user is a plurality of users; and
   the priority stand-by position is determined from the plurality of stand-by positions such that a sum of traveling time from the priority stand-by position to each of the plurality of users is shortest.

4. The mobile apparatus according to claim 1, wherein the at least one user is a plurality of users; and
   the priority stand-by position is determined from the plurality of stand-by positions such that a sum of traveling time from the priority stand-by position to each of the plurality of users is shortest, the sum of traveling time is calculated based on each of the plurality of users weighted or a location of each of the plurality of users weighted.

5. The mobile apparatus according to claim 1, wherein the controller of the mobile apparatus has a mode in which, after traveling to the at least one user and providing the service, the mobile apparatus temporarily stands by at a position which is determined based on the location of the at least one user.

6. The mobile apparatus according to claim 1, wherein the controller of the mobile apparatus has a mode in which the mobile apparatus travels to the at least one user according to an instruction from the at least one user prior to receiving the instruction to provide the service from the at least one user.

7. A mobile apparatus according to claim 1, wherein mobile apparatus travels around in the service provision area during a period during which the mobile apparatus waits for the instruction to provide a service.

8. A service providing system comprising:
   a client apparatus that transmits the instruction to provide the service according to an operation of the at least one user; and
   the mobile apparatus according to claim 7.

9. A service providing system comprising:
   a client apparatus that transmits an instruction to provide a service according to an operation of a user; and
   a mobile apparatus that travels within a predetermined service provision area, the mobile apparatus including a controller configured to control the mobile apparatus to:
      in response to receiving, from the client apparatus of the user present in the service provision area, the instruction to provide the service, travel to the user to provide the service to the user, and
   after providing the service to the user, move to a priority stand-by position, which is determined from a plurality of stand-by positions provided within the service provision area based on a location of the user, and wait for a subsequent instruction to provide a service.

10. The service providing system according to claim 9, further comprising:
    a server apparatus that includes:
       an instruction reception unit which receives the instruction to provide a service transmitted from the client apparatus, and
       a service instruction unit which instructs the mobile apparatus to provide the service according to the instruction received by the instruction reception unit.

* * * * *